United States Patent [19]
Kasprzak

[11] 3,809,805
[45] May 7, 1974

[54] VIDEO BANDWIDTH REDUCTION

[75] Inventor: Vincent Kasprzak, Auburn, Calif.
[73] Assignee: Arvin Industries, Inc., Columbus, Ind.

[22] Filed: Aug. 25, 1972
[21] Appl. No.: 283,806

[52] U.S. Cl.... 178/6.6 A, 178/DIG. 3, 179/15.55 R
[51] Int. Cl. .......................... H04n 5/78, H04n 7/12
[58] Field of Search............ 178/6.6 A, 6.8, DIG. 3, 178/DIG. 24; 179/100.2 T, 15.55 R, 15.55 T

[56] References Cited

UNITED STATES PATENTS

| | | | |
|---|---|---|---|
| 3,499,996 | 3/1970 | Klayman | 179/15.55 R |
| 2,867,685 | 1/1959 | Johnson | 178/6.6 A |
| 3,392,385 | 7/1968 | Martin | 178/DIG. 24 |
| 3,403,231 | 9/1968 | Slaton | 179/100.2 T |
| 3,553,080 | 1/1971 | Hammond | 179/15.55 R |
| 3,621,150 | 11/1971 | Pappas | 179/15.55 T |
| 3,634,625 | 1/1972 | Geohegan | 179/15.55 R |

*Primary Examiner*—Howard W. Britton
*Attorney, Agent, or Firm*—Biebel, French & Bugg

[57] ABSTRACT

A high frequency signal is periodically applied to one each of a plurality of variable delay lines which receive and store respective portions of the high frequency signal. While one line is receiving and storing a high frequency signal portion the other previously stored portions are retrieved substantially simultaneously from the other delay lines, with the other delay lines operating in a low speed mode. The high frequency signal is thus continuously converted into a multiplicity of related signals each of lower bandwidth. The sequence is reversed for reconstruction of the original high frequency signal.

28 Claims, 4 Drawing Figures

VIDEO BANDWIDTH REDUCTION

BACKGROUND OF THE INVENTION

This invention relates to recording and transmission systems, and more particularly to a bandwidth reduction system for high frequency signals such as video television signals.

As is well known, the cost of recording and transmitting equipment for high frequency signals increases substantially as the frequency capacity of the system is increased. It is thus highly desirable to reduce the bandwidth (maximum frequency) of the signal as much as possible.

A way to reduce the bandwidth of a signal, and thus to enable the use of equipment having a lower bandwidth capacity, is to "divide" the high frequency signal into several parallel low frequency signals. Each of the low frequency signals is then sent through a lower bandwidth channel, with the toal information capacity of the channels equalling the information content of the original high frequency signal. When the original signal is to be recovered, it is reconstructed from the parallel low bandwidth channels.

As an example, bandwidth reduction of high frequency video signals has been achieved by rapidly and periodically sampling the video signal and distributing the resulting samples to an arbitrary number ($n$) of record channels. The sample signals are allocated to a channel every nth sample. Further, the samples between $Qn + n'$ and $(Q + 1)n + n'$ are distributed sequentially to the other channels (Q is any integer between 1 & ∞ and $n'$ is a channel number, $n$ was previously defined as the number of channels). For example, in a 10 channel system, channel number 1 receives samples 1, 11, 21, etc.; number 2 receives samples 2, 12, 22, etc; . . . number 10 receives samples 10, 20, 30, etc. Additionally, the sampled amplitude information is held (maintained or remembered) until the next sample allocated to that cahnnel occurs, at which time the former sample is replaced by the next sample.

The system sample frequency ($F_s$) is quite high, being equal to $2f_{\nu\ max}$, where $f_{\nu\ max}$ is equal to the highest input frequency. This is a requirement of the Nyquist sampling theory. Quite obviously, the channel sample frequency ($F'_s$) is equal to $2f_{\nu\ max}/n = F'_s$.

The highest frequency per channel ($f'_{\nu\ max}$) is $f_{\nu\ max}/n$. This is so since $F'_s = 2\ f'_{\nu\ max}$, so that $2f_{\nu\ max}/n = 2f'_{\nu\ max}$, and hence $f_{\nu\ max}/n = f'_{\nu\ max}$. Therefore, the reduced bandwidth that each channel carries is reduced by the factor $n$ ($n$ being the number of channels).

Playback is accomplished by reversing the process. The information is sampled from each channel in the same sequence as it is recorded. All sampled channel outputs are common and sample update at that common output occurs at the system sample rate $F_s$. Hence, the original bandwidth is recovered since $f_{2\nu\ max} = F_s/2$.

While the aforementioned system is quite satisfactory, it presents certain design and cost problems because sample feedthrough, amplitude differences and phase differences between recorded channels can cause unwanted interference signals to be added to the video signal, and steps must be taken to compensate or eliminate such interference. This requires the addition of filtering and equalization networks.

SUMMARY OF THE INVENTION

Briefly, this invention provides a method and apparatus for reducing the bandwidth of a high frequency signal by dividing the signal into a multiplicity of related signals each of lower bandwidth.

Rather than sampling the signal and writing each sample result into a separate channel, entire portions of the high frequency signal are written sequentially into one each of a plurality of variable storage means or delay lines.

The delay lines may be operated at various speeds including high speed and low speed modes. The signal portions are written into each delay line when operating respectively in high speed mode and the portions are then recovered by operating each line at low speed mode. The output from each delay line is thus a signal of considerably reduced bandwidth.

Since it takes much longer to recover the lower bandwidth signals from the delay lines than it takes to record the high bandwidth signal portions into them, the lower bandwidth signal portions are continuously and simultaneously recovered from all the delay lines except the one presently receiving a signal portion in the high speed mode.

The high frequency signal is thus divided by the bandwidth reduction system into signal portions which appear as a multiplicity of related signals each of lower bandwidth. These signals are then simultaneously transmitted or recorded on equipment having a corresponding multiplicity of lower bandwidth channels.

Playback or recovery of the high frequency signal is accomplished by the reverse sequence. The lower bandwidth portions are simultaneously received by the delay lines or storage means in the low speed mode and then each delay line is operated at a high speed mode to recover its respective signal portion at the original high frequency, while the remaining delay lines continue to receive additional signal portions in the low speed mode. The delay lines are thus continuously selected and sampled one at a time, with the original high frequency signal thus being reconstructed from the multiplicity of related lower bandwidth signals.

It is therefore an object of this invention to provide a method and apparatus for reducing a high frequency signal to a multiplicity of related signals each of lower bandwidth; a bandwidth reduction system enabling the transmission and/or recording of high frequency signals on equipment of lower bandwidth capacity through the use of a multiplicity of channels thereon; a system enabling reconstruction of the original high frequency signal from the multiplicity of related lower bandwidth signals; a system using a plurality of variable storage means or delay lines to store entire portions of the high frequency signal in high or low speed mode; a system in which the signal portions can be retrieved from the storage means, respectively, in low or high speed mode; and to accomplish all the above objects and purposes in an inexpensive, uncomplicated, practical and efficient configuration fully compatible with existing transmission and recording facilities, to enable the effective frequency capacity thereof to be increased substantially.

Other objects and advantages of the invention will be apparent from the following description, the accompanying drawings and the appended claims.

DESCRIPTION OF THE PREFERRED EMBODIMENTS

Figure 1:
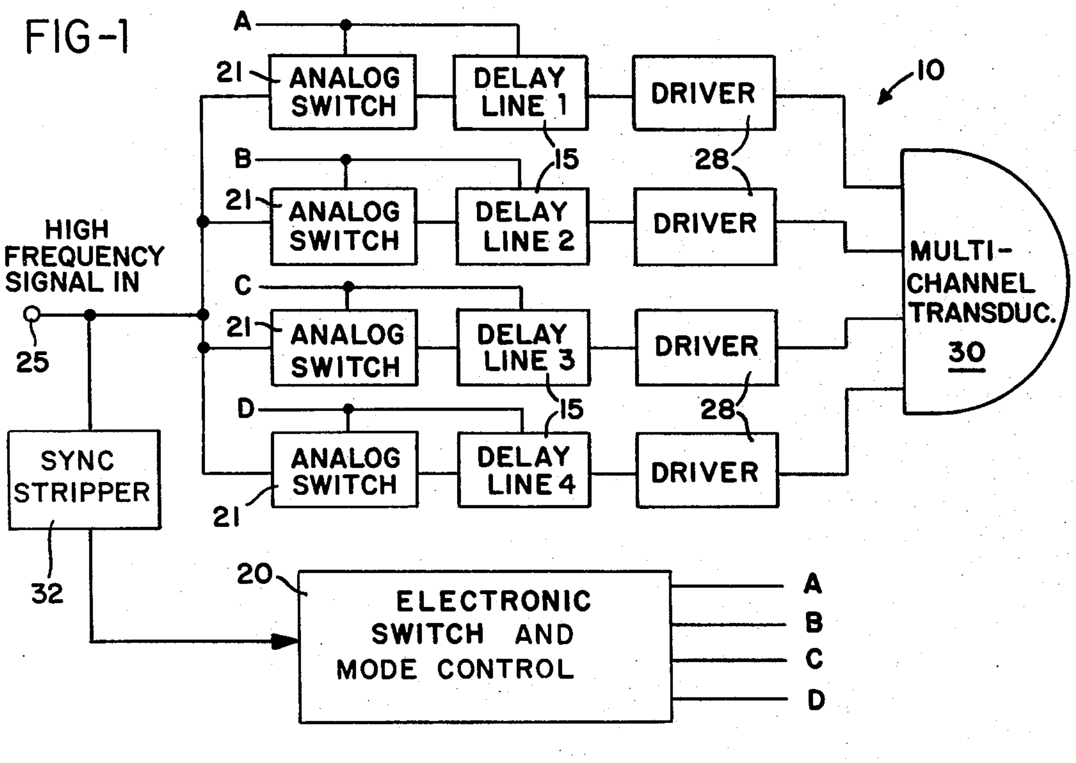
FIG. 1 is a block diagram of a recording or transmitting system according to the present invention.

With reference to the drawings, and more particularly to FIG. 1, there is illustrated a recording or transmission system 10 for recording or transmitting a high frequency signal. In this invention, the high frequency signal is sequentially distributed into a plurality of variable storage means or delay lines 15, such as delay lines 1–4 in FIG. 1. Entire portions of the high frequency signal are written into each of the delay lines 15, and the delay lines receive their respective portions of the high frequency signal in a high speed mode compatible therewith, until the line is filled.

The variable storage means, or delay lines, 15 are capable of receiving or sending signals at any of a broad range of controllable rates. Such devices are known in the art, as may be seen, for example, in "The New Concept for Memory and Imaging: Charge Coupling" (Electronics Magazine, June, 1971, page 50), and in "Pass the Bucket" (The Electronic Engineer, December, 1971, page 12). See also U.S. Pat. No. 3,553,356, col. 6, lines 68–69. The variable delay line can also be implemented by processing the signal through an A/D converter, transmitting the digital information through digital shift registers (digital delay lines) and then converting the information back to an analog format by processing the digital signal through a D/A converter. However, although it's possible to use the digital technique, charge coupling and bucket brigade are the preferred embodiment of this invention. In the present invention, the delay lines are operated in either a low speed or high speed mode.

A switch 20 controls a plurality of analog switches 21 which are connected to a common high frequency terminal 25. Each analog switch 21 is also connected respectively to one of the plurality of variable delay lines 15, to control the application of the high frequency signal of terminal 25 to the respective variable delay lines 15. In addition to controlling the analog switches 21, switch 20 also controls the delay lines 15 to place them selectively in the high or low speed mode.

The outputs of the delay lines are each connected to drivers 28, which in turn are connected to a multichannel transducer 30.

Switch 20 is arranged for periodic and sequential selection of one analog switch and its corresponding delay line at a time. Switch 20 thus selects a delay line 15, connects the selected delay line through its analog switch 21 with the high frequency signal present on terminal 25, and places the selected delay line or storage means 15 in the high frequency mode for receiving a portion of the high frequency signal. Switch 20 maintains this condition either for a preset time period or until the selected variable delay line or storage means 15 has been filled to capacity. At that point switch 20 selects another delay line 15 and associated analog switch 21, for receiving the next portion of the high frequency signal.

Switch 20 also controls the modes of the unselected delay lines 15 to keep them in the low speed mode whenever they are unselected. Since the variable delay lines or storage means remain operational at all times, whatever signals have been received and stored therein continue to propogate therethrough, and switch 20 will not again select a particular delay line or storage means 15 until the entire portion of the signal stored therein has been read out of it. These signal portions therefore ultimately appear at the outputs of the delay lines at low frequency, in response to the low speed operation of the unselected delay lines. The outputs of the delay lines are never high speed/high frequency because switch 20 switches to another line 15 as soon as an earlier one is filled (or sooner), thus placing the former in the low speed mode before the input can reach the output.

The low frequency outputs are subsequently passed to the drivers 28, one for each line 15, and then to the multi-channel transducer 30, such as a multi-channel recorder or transmitter. Transducer 30 then records the multiplicity of low frequency signals for subsequent recovery or transmits them to a compatible receiving unit.

Since one delay line 15 will always be in a high frequency or receiving mode, there will be N−1 remaining delay lines in the low frequency mode (where N equals the total number of delay lines 15). Thus the high frequency mode may be N−1 times as great as the low frequency mode, since for any cycle of the system each individual delay line will spend 1/Nth of the period receiving the high frequency signal and (N−1)/N of the period writing that portion of the signal. Thus the high frequency signal will have a bandwidth N−1 times greater than the bandwidth of the multiplicity of related signals appearing on multi-channel transducer 30.

The present invention, operated at regular intervals, has proven particularly valuable in the handling of standard television signals. In such an application switch 20 is keyed or controlled by the horizontal sync pulses of the video signal, and an optional sync stripper may then be used to pass only sync pulses to switch 20. One entire video line of the signal is written into each variable delay line or storage means 15, and for each scan of the television tube, the delay lines are sequentially selected one or more times, depending on the total number of delay lines or channels present. The bandwidth of the stored portions of the signal is then reduced by a very appreciable factor since, after a given video line is stored, the time delay parameter of that respective delay line or storage means 15 is increased by the factor N−1 when it is placed in the low speed mode.

Thus, when the video lines are recovered from the outputs of each of the delay lines 15, the bandwidths of the respective video signal portions are reduced by the factor N−1 (since it takes N−1 times longer to read out the information than it took to write it in.) All the video information is present, except that it does not appear in real time, and except that each video line appears on a separate channel. In standard television signals, the period of each horizontal video line is 63.5 μsec., and switch 20 would therefore operate with the same period.

Timing for switch 20 may alternatively be derived, for example, by counting the high frequency signal itself with an appropriate clock within switch 20. When the clock counts up to the total storage capacity of the selected delay line, switch 20 is then activated to select another delay line, and the earlier delay line is returned to the low speed mode.

Figure 2:
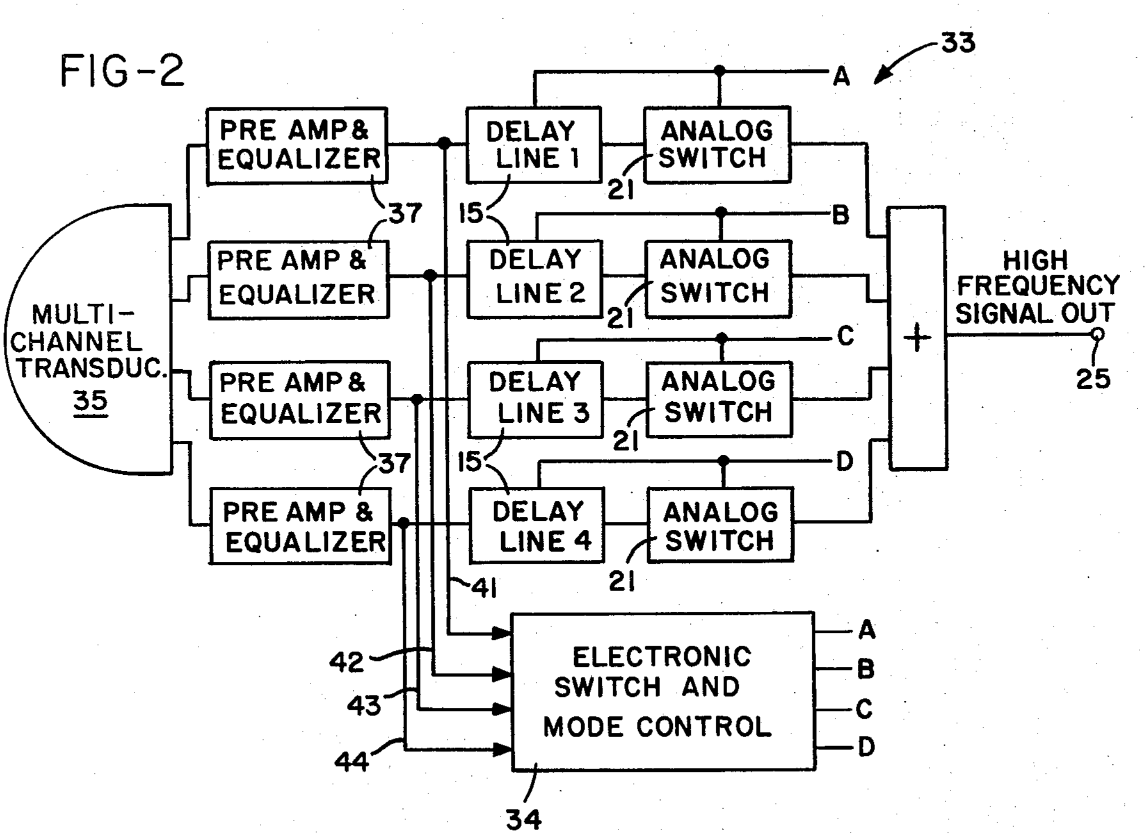
FIG. 2 is a block diagram of a playback or receiving system according to the present invention.

When it is desired to recover the original high frequency signal, this inveniton is slightly modified to the form illustrated in FIG. 2. The playback or receiving system 33 of FIG. 2 employs the same variable storage means 15, analog switches 21, and high frequency terminal 25, as the recording or transmitting configuration of FIG. 1. The switch and mode control 34 may also be the same switch as switch 20 in system 10.

However, in the playback or receiving mode, the multiplicity of related signals, each of lower bandwidth, are each separately received by a multi-channel transducer 35, such as a multi-channel receiver or playback head, and are separately applied to pre-amps and equalizers 37. The outputs of the pre-amps and equalizers 37 are then applied both to their respective variable delay lines or storage means 15 and to switch 34, through respective lines 41–44. The variable storage means 15, in turn, have their outputs selectively connected to their respective analog switches 21, which connect to the common high frequency terminal 25 on which the high frequency output signal appears. Switch 34 controls analog switches 21 and the modes of the delay lines 15 as switch 20 does in the recording or transmitting device of FIG. 1.

When playback or receiving system 33 is used for reproducing a reduced bandwidth television signal, analogous to the application of system 10 discussed above, switch 20 will have a period of $63.5 \times N$ $\mu$sec. per channel. Where irregular and random signals have been reduced but are to be played back continuously, switch 20 in the playback or receiving device 33 will operate the delay lines 15 at a playback frequency which yields a substantially continuous high frequency output on terminal 25.

Synchronization between system 10 and system 33 is made possible by the "silent" periods which normally occur in each channel once each cycle thereof. In the case of a television signal, for example, it takes 63.5 $\mu$sec. to write the information into one storage means or delay line 15. The signal is written in, however, only after the previous signal portion has been fully unloaded. Thus no signal is present on the otput of the delay line during the 63.5 $\mu$sec. time interval it is receiving or loading the new portion of the high frequency signal. The onset on each silent period, therefore, is carried to switch 34 on lines 41, 42, etc., and keys switch 34 to select the next appropriate delay line. This signal gap in each channel can also be advantageously employed, for example, by shifting the playback signal about in time in order to compensate for synchronization errors which might otherwise appear. This time base correction processing could be done by continuously varying the delay factor, N–1, during the playback. Control for this can be obtained from the error voltage of a phased locked loop that has a bandwidth lower than that of the time base frequency component to be corrected. The phase locked loop would be locked to a pre-recorded pilot signal or to the horizontal sync.

Figure 3:
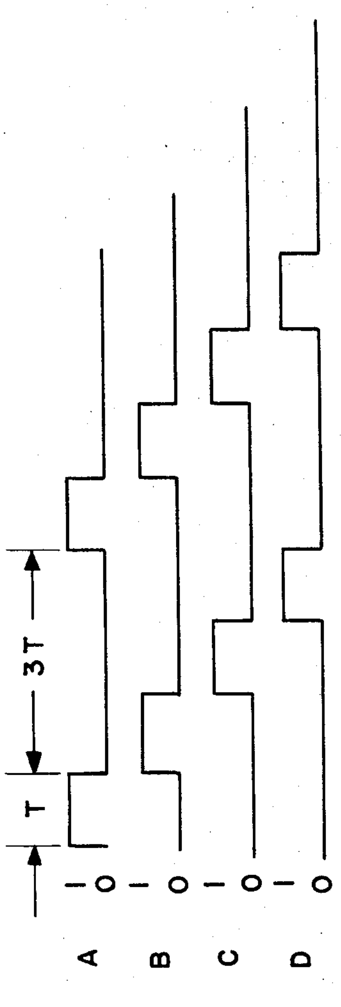
FIG. 3 illustrates a time chart for the systems of FIGS. 1 and 2.

FIG. 3 is a timing chart illustrating the operation of a four-channel device according to this invention. Each of the four channels is in the high speed (or 1) mode during its period T, and in the low speed (or 0) during its period 3T. Thus the entire system cycles once each interval of 4T.

Figure 4:
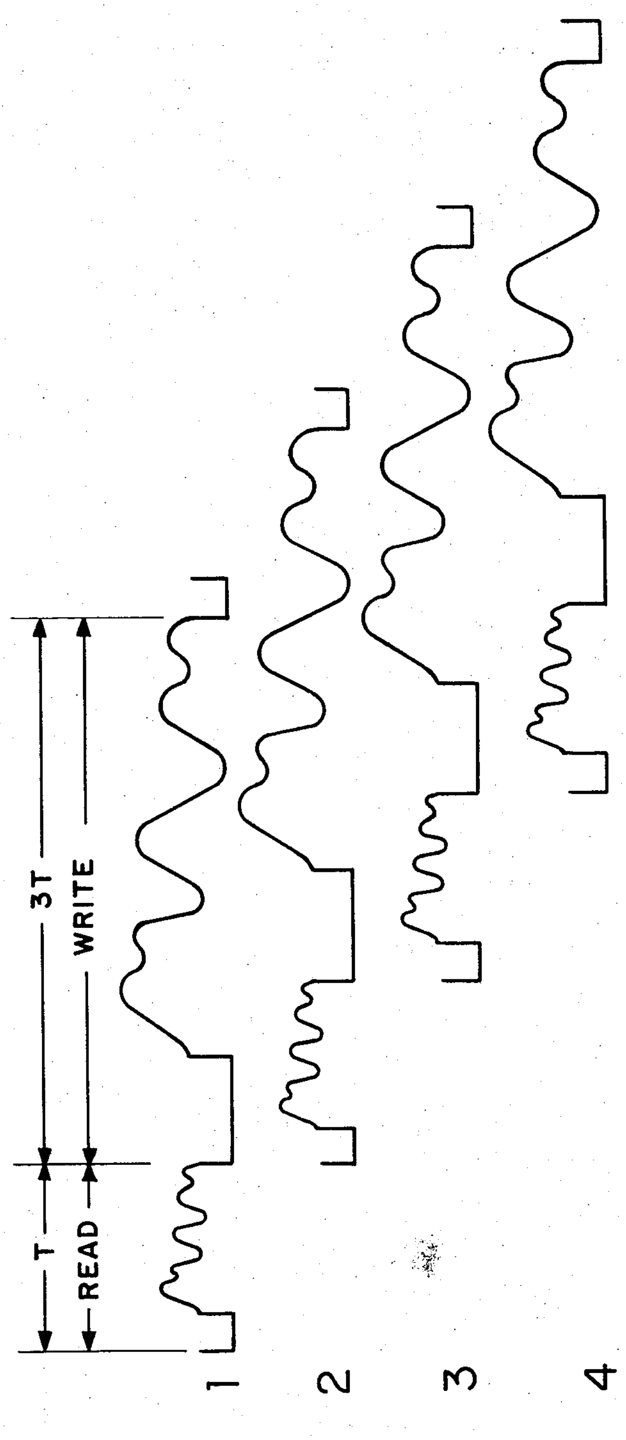
FIG. 4 illustrates the effects of the FIG. 1 delay lines upon portions of an illustrative high frequency signal.

FIG. 4 illustrates the bandwidth reduction effect of the device of FIG. 1 when operated according to the timing chart of FIG. 3. In this case the high frequency signal is broken into four portions, each portion applied respectively and sequentially to each channel in its respective time period T. The same signals are then separately read from the channels at one-third the frequency or bandwidth, in the respective writing intervals 3T.

This invention therefore makes possible a bandwidth reduction system for recording or transmission of high frequency signals as a multiplicity of related signals each of lower bandwidth. The advantages in terms of the simplification of the problems of sampling feedthrough, amplitude differences, phase differences, noise and switching interferences, and so on, should be readily apparent as related to the other reduction methods.

While the methods and forms of apparatus herein described constitute preferred embodiments of the invention, it is to be understood that the invention is not limited to these precise methods and forms of apparatus, and that changes may be made therein without departing from the scope of the invention.

What is claimed is:

1. A bandwidth reduction system for recording or transmission of essentially the entire contents of high frequency signals as a multiplicity of related signals each of lower bandwidth and in sum equalling the high frequency signal, comprising:

a. a common terminal for the high frequency signal, b. a plurality of storage means in each of which an entire portion of the signal can be stored and retrieved, each signal portion potentially including a plurality of amplitude levels, and each storage means having selectable low and high speed modes, c. switch means controlling access to said storage means from the common terminal for periodic and sequential selection of one of said storage means to connect the selected storage means to said common signal terminal, said switch means at all times selecting and connecting at least one of said storage means to said terminal for continuous reception of uninterrupted portions of the high frequency signal, d. mode control means to place the selected storage means in high speed mode and to keep the unselected storage means in low speed mode, and e. a plurality of transducer means for recording or transmitting signal, at least one each of said transducer means being connected to one each of said storage means for reception of said portions of said signal from said storage means while said storage means are operating in the low speed mode, said portions of said signal in each of said transducer means thereby being of lower bandwidth with said plurality of transducer means thereby recording or transmitting essentially the entire contents of the high frequency signal as a multiplicity of related signals each of lower bandwidth.

2. The system of claim 1 wherein said transducer means is a recording device for recording said portions of said signal for subsequent recombination of the multiplicity of related signals into the original high frequency signal.

3. The system of claim 1 wherein said transducer means are transmission means for carrying said portions of said signal to a receiving means for recombination of the multiplicity of related signals into the original high frequency signal.

4. The system of claim 3 wherein said transducer means also include a recording device.

5. The system of claim 1 wherein said storage means are selected at regular time intervals.

6. The system of claim 5 wherein said transducer means is a recording device for recording said portions of said signal for subsequent recombination of the multiplicity of related signals into the original high frequency signal.

7. The system of claim 5 wherein said transducer means are transmission means for carrying said portions of said signal to a receiving means for recombination of the multiplicity of related signals into the original high frequency signal.

8. The system of claim 7 wherein said transducer means also include a recording device.

9. The system of claim 5 wherein said intervals are related to the scan frequency of a television system.

10. The system of claim 9 wherein said intervals are approximately 63.5 μsec.

11. A bandwidth reduction system for recording or transmission of essentially the entire contents of high frequency signals as a multiplicity of related signals each of lower bandwidth and in sum equalling the high frequency signal, comprising:

a. a common terminal for the high frequency signal,
b. N storage means in each of which an entire portion of the signal can be stored and retrieved, each signal portion potentially including a plurality of amplitude levels, and each storage means having selectable low and high speed modes, with the high speed mode being (N−1) times faster than the low speed mode,
c. switch means controlling access to said storage means from the common terminal for periodic, continuous, and sequential selection, at regular time intervals related to the scan frequency of a television system, of one of said storage means to connect the selected storage means to said common signal terminal for continuous reception of uninterrupted portions of the high frequency signal,
d. mode control means to place the selected storage means in high speed mode and to keep the unselected storage means in low speed mode,
e. a sync stripper between said common terminal and said switch means to pass synchronization signals to said switch means without passing the high frequency signal, and
f. a plurality of transducer means for recording or transmitting signals, at least one each of said transducer means being connected to one each of said storage means for reception of said portions of said signal from said storage means while said storage means are operating in the low speed mode, said portions of said signals in each of said transducer means thereby being of lower bandwidth with said plurality of transducer means thereby recording or transmitting essentially the entire contents of the high frequency signal as a multiplicity of related signals each of lower bandwidth, and said high frequency signal having a bandwidth (N−1) times greater than the multiplicuty of related lower bandwidth signals.

12. A bandwidth reduction system for playback or reception of essentially the entire contents of original high frequency signals from a multiplicity of related signals each of lower bandwidth and in sum equalling the original high frequency signal, comprising:

a. a common terminal for the high frequency signal,
b. a plurality of storage means in each of which an entire portion of the signal can be stored and retrieved, each signal portion potentially including a plurality of amplitude levels, and each storage means having selectable low and high speed modes,
c. switch means controlling access from said storage means to the common terminal for periodic and sequential selection of one of said storage means to connect said selected storage means to said common signal terminal, said switch means at all times selecting and connecting at least one of said storage means to said terminal for continuous transmission thereto of uninterrupted portions of the high frequency signal,
d. mode signal means to place said selected storage means in high speed mode and to keep the unselected storage means in low speed mode, and
e. a plurality of transducer means for playing back or receiving said portions of said signals, at least one each of said transducer means being connected to one each of said storage means for transmitting said portions of said signal to said storage means while said storage means are operating in the low speed mode, said portions of said signal thereby being presented to said common terminal as a high frequency signal by said storage means when in the high speed mode, said high frequency signal having essentially the entire contents of the original high frequency signal.

13. The system of claim 12 wherein said transducer means is a playback device for recorded signals for reproducing said portions of said signal for recombination of the multiplicity of related signals into the original high frequency signal.

14. The system of claim 12 wherein said transducer means are transmission means for carrying said portions of said signal to said storage means for recombination of the multiplicity of related signals into the original high frequency signal.

15. The system of claim 14 wherein said transducer means also include a playback device.

16. The system of claim 12 wherein said storage means are selected at regular time intervals.

17. The system of claim 16 wherein said transducer means is a playback device for recorded signals for reproducing said portions of said signal for subsequent recombination of the multiplicity of related signals into the original high frequency signal.

18. The system of claim 16 wherein said transducer means are transmission means for carrying said portions of said signal to said storage means for recombination of the multiplicity of related signals into the original high frequency signal.

19. The system of claim 18 wherein said transducer means also include a playback device.

20. The system of claim 16 wherein said intervals are related to the scan frequency of a television system.

21. The system of claim 20 wherein said intervals are approximately 63.5 μsec.

22. A bandwidth reduction system for playback or reception of essentially the entire contents of original high frequency signals from a multiplicity of related signals each of lower bandwidth and in sum equalling the original high frequency signal, comprising:

a. a common terminal for the high frequency signal,
b. N storage means in each of which an entire portion of the signal can be stored and retrieved, each signal portion potentially including a plurality of amplitude levels, and each storage means having selectable low and high speed modes, with the high speed mode being (N−1) times faster than the low speed mode,
c. switch means controlling access from said storage means to the common terminal for periodic, continuous, and sequential selection, at regular time intervals related to the scan frequency of a television system, of one of said storage means to connect said selected storage means to said common signal terminal for continuous transmission thereto of uninterrupted portions of the high frequency signal,
d. mode control means to place said selected storage means in high speed mode and to keep the unselected storage means in low speed mode, and
e. a plurality of transducer means for playing back or receiving said portions of said signals, at least one each of said transducer means being connected to one each of said storage means for transmitting said portions of said signal to said storage means while said storage means are operating in the low speed mode, said portions of said signal thereby being presented to said common terminal as a high frequency signal by said storage means when in the high speed mode, said high frequency signal having essentially the entire contents of the original high frequency signal, and said high frequency signal having a bandwidth (N−1) times greater than the multiplicity of related lower bandwidth signals.

23. The method of reducing the bandwidth of a high frequency signal into a multiplicity of related signals each of lower bandwidth and in sum equalling the high frequency signal, comprising:

a. periodically, continuously, and sequentially selecting one out of a plurality of storage means having selectable low and high speed modes, one of the storage means being selected at all times,
b. controlling the modes of the storage means to place the selected storage means in high speed mode and to keep the unselected storage means in low speed mode,
c. storing an entire portion of the high frequency signal in the selected storage means, each signal portion potentially including a plurality of amplitude levels, and
d. retrieving the stored portions of the high frequency signal from the storage means when in low speed mode, the retrieved portions being of lower bandwidth and forming a multiplicity of related signals each of lower bandwidth and containing essentially the entire contents of the high frequency signal.

24. The method of claim 23 wherein the storage means are selected at intervals related to the scan frequency of a television system.

25. The method of claim 24 wherein the intervals are approximately 63.5 μsec.

26. The method of reconstructing a high frequency signal from a multiplicity of related signals each of lower bandwidth and in sum equalling the high frequency signal, comprising:

a. periodically, continuously, and sequentially selecting one out of a plurality of storage means having selectable low and high speed modes, one of the storage means being selected at all times,
b. controlling the modes of the storage means to place the selected storage means in high speed mode and to keep the unselected storage means in low speed mode,
c. storing each of the respective multiplicity of related signals of lower bandwidth in one each of the unselected storage means, the signals being stored as entire portions of the high frequency signal, each signal portion potentially including a plurality of amplitude levels, and
d. recovering the portions of the high frequency signal from the storage means when in the high speed mode, the recovered portions being of greater bandwidth and combining to reconstruct essentially the entire contents of the high frequency signal.

27. The method of claim 26 wherein the storage means are selected at intervals related to the scan frequency of a television system.

28. The method of claim 27 wherein the intervals are approximately 63.5 μsec.

* * * * *

Dedication 3,809,805.—*Vincent D. Kasprzak*, Auburn, Calif. VIDEO BANDWIDTH REDUCTION. Patent dated May 7, 1974. Dedication filed Feb. 19, 1976, by the assignee, *Arvin Industries, Inc.*

Hereby dedicates the remainder of the term of said patent.

[*Official Gazette March 30, 1976.*]